(12) United States Patent
Okawa et al.

(10) Patent No.: US 7,040,080 B2
(45) Date of Patent: May 9, 2006

(54) TRACK LINK PRODUCTION METHOD AND TRACK LINK PRODUCED BY THE SAME

(75) Inventors: Kazuhide Okawa, Yawata (JP); Hiroshi Sunada, Hirakata (JP)

(73) Assignee: Komatsu Ltd., Tokyo (JP)

( * ) Notice: Subject to any disclaimer, the term of this patent is extended or adjusted under 35 U.S.C. 154(b) by 344 days.

(21) Appl. No.: 10/391,499

(22) Filed: Mar. 18, 2003

(65) Prior Publication Data
US 2003/0230069 A1    Dec. 18, 2003

(30) Foreign Application Priority Data
Jun. 14, 2002    (JP)    ............... 2002-174848

(51) Int. Cl.
F16C 7/00    (2006.01)
B26D 55/20    (2006.01)
B21L 5/00    (2006.01)
C21D 1/06    (2006.01)

(52) U.S. Cl. .................. 59/35.1; 59/8; 305/201; 305/185; 148/654; 148/649

(58) Field of Classification Search ............ 59/4, 59/8, 35.1; 305/185, 201; 148/654, 649
See application file for complete search history.

(56) References Cited

U.S. PATENT DOCUMENTS

| 4,419,152 | A | * | 12/1983 | Grilli et al. | ............... | 148/654 |
| 5,500,058 | A | * | 3/1996 | Hirakawa et al. | ......... | 148/649 |
| 5,759,309 | A | * | 6/1998 | Watts et al. | ............... | 148/654 |
| 6,742,853 | B1 | * | 6/2004 | Takeno et al. | .............. | 305/185 |

FOREIGN PATENT DOCUMENTS

| JP | 57-051583 | 3/1982 |
| JP | 60-075514 | 4/1985 |
| JP | 5-9488 | 2/1993 |

* cited by examiner

Primary Examiner—David B. Jones
(74) Attorney, Agent, or Firm—Frishauf, Holtz, Goodman & Chick, P.C.

(57) ABSTRACT

There are proposed a track link production method capable of providing markedly improved wear life with good cost performance and a track link produced by this method. To this end, the track link production method includes a heat treatment process (Steps 4, 5) of applying quenching and low temperature tempering treatment to a whole link material after hot forging (Step 2), and is designed such that desired machining is applied to the link material (Step 3) before the heat treatment process (Steps 4, 5) and such that after the heat treatment process (Steps 4, 5), tempering (Step 6) and finish machining (Step 7) are sequentially applied to some of the parts which have undergone the machining process, the some parts including at least parts where high dimensional accuracy is required.

4 Claims, 6 Drawing Sheets

A PROCESS CHART OF A TRACK LINK PRODUCTION METHOD ACCORDING TO ONE EMBODIMENT OF THE INVENTION

IF THE AMOUNT OF STRAIN IN STEPS 5, 6 IS NOT A PRACTICAL PROBLEM, FINISH MACHINING IN STEP 7 MAY BE OMITTED.

FIG. 3

A PROCESS CHART OF A TRACK LINK PRODUCTION METHOD ACCORDING TO ONE EMBODIMENT OF THE INVENTION

| PROCESS ORDER | PROCESS | |
|---|---|---|
| 1 | MATERIAL (ROUND OR SQUARE BAR) ↓ | |
| 2 | HOT FORGING ↓ | |
| 3 | MACHINING: PARTS 11,12,13,14,15,16,17 IN FIG.2 (ROUGH PROCESSING) ↓ | |
| 4 | ENTIRE QUENCHING (WATER, OIL, SOLUBLE AGENT OR SIMILAR QUENCHING MEDIUM) ↓ | |
| 5 | ENTIRE TEMPERING (LOW TEMPERATURE TEMPERING) ↓ | |
| 6 | PARTIAL TEMPERING: NEIGHBORHOOD OF PARTS 13,14,15 IN FIG.2 ↓ | HATCHED AREA: TEMPERING |
| 7 | MACHINING: PARTS 11,12,13,14,15,16,17 IN FIG.2 (FINISH MACHINING) | |

IF THE AMOUNT OF STRAIN IN STEPS 5, 6 IS NOT A PRACTICAL PROBLEM, FINISH MACHINING IN STEP 7 MAY BE OMITTED.

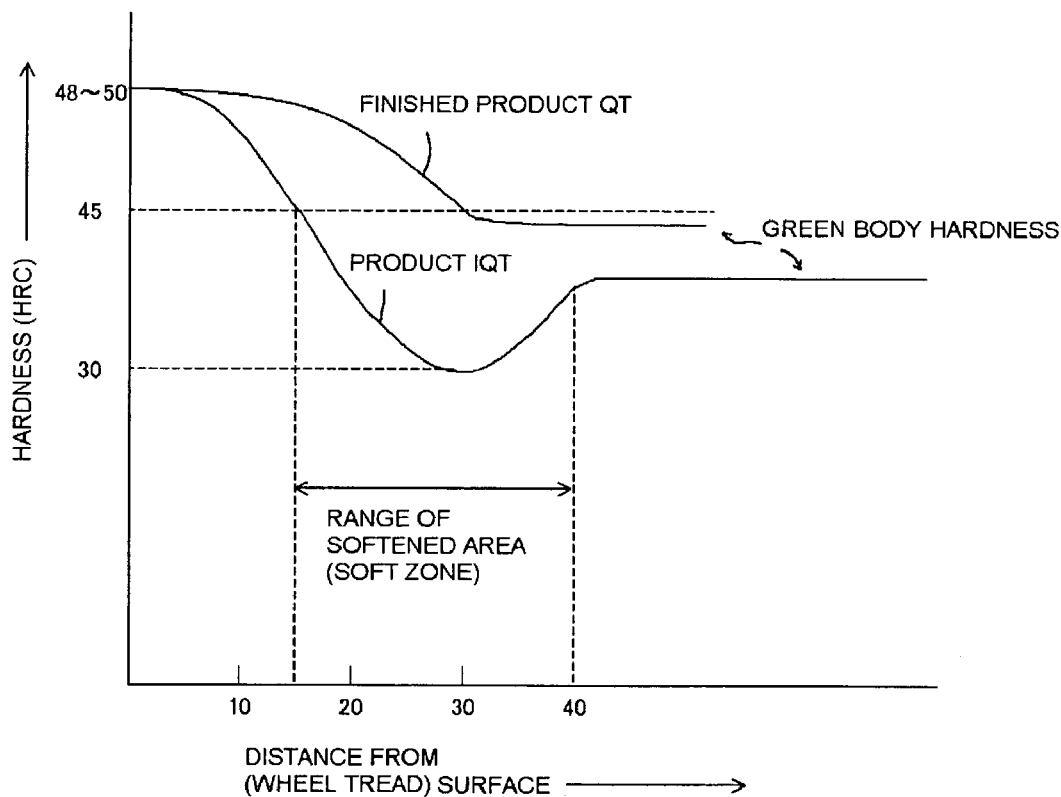

FIG. 5

A PROCESS CHART OF A TRACK LINK PRODUCTION METHOD ACCORDING TO THE PRIOR ART

| PROCESS ORDER | PROCESS | |
|---|---|---|
| 1 | MATERIAL (ROUND OR SQUARE BAR) ↓ | |
| 2 | HOT FORGING ↓ | |
| 3 | ENTIRE QUENCHING (WATER, OIL, SOLUBLE AGENT OR SIMILAR QUENCHING MEDIUM) ↓ | |
| 4 | ENTIRE TEMPERING (HIGH TEMPERATURE TEMPERING) ↓ | |
| 5 | MACHINING: PARTS 11,12,13,14,15,16,17 IN FIG.2 (ROUGH PROCESSING) ↓ | |
| 6 | WHEEL TREAD PART INDUCTION QUENCHING (WATER OR SOLUBLE AGENT) ↓ | |
| 7 | WHEEL TREAD PART TEMPERING (LOW TEMPERATURE TEMPERING) | |
| 8 | MACHINING: PARTS 11,12,13,14,15,16,17 IN FIG.2 (FINISH MACHINING) | |

AREA MARKED WITH WAVY LINE: QUENCHING/TEMPERING

IF THE AMOUNT OF STRAIN IN STEPS 6,7 IS NOT A PRACTICAL PROBLEM, FINISH MACHINING IN STEP 8 MAY BE OMITTED.

A GRAPH SHOWING A TEMPERATURE DISTRIBUTION WHERE HIGH-FREQUENCY HEATING IS APPLIED TO A TRACK LINK

TRACK LINK PRODUCTION METHOD AND TRACK LINK PRODUCED BY THE SAME

TECHNICAL FIELD

The present invention relates to a method of producing a track link which is a component of an endless track crawler belt for use in construction equipment such as hydraulic excavators and bulldozers and a track link produced by the same.

BACKGROUND ART

For example, a crawler belt for the undercarriage of a bulldozer is constituted by track shoes, track links, coupling pins, track bushings and seals. Each track shoe is fastened to laterally paired track links with bolts and nuts (see FIG. 1). Each track link has (a) a wheel tread which comes in rolling contact with a track roller, (b) a shoe mounting surface to which a track shoe is attached, (c) a pin hole for receiving a coupling pin inserted therein, (d) a bushing hole for receiving a track bushing inserted therein, (e) a seal counter bore to which a seal is fit, (f) shoe bolt holes for receiving track shoe clamping bolts inserted therein, and (g) shoe nuts bearing surface on which track shoe clamping nuts sit.

The above track link is conventionally produced by a production method comprised of such steps as shown in FIG. 5. Specifically, a round (square) bar made of high strength steel such as SMn based steel, SCM based steel or SNCM based steel is first prepared (Step 1). Then, this material is formed by hot forging into a link material which is substantially similar, in form, to a finished product (Step 2). Thereafter, the link material is entirely quenched by a quenching medium such as water or oil (Step 3). Subsequently, this quenched link material is tempered at a high temperature of about 400° C. to 650° C. (Step 4), thereby obtaining a high-strength, tempered, martensitic (sorbite) metal structure. In this way, the hardness of the link material is made to be HRC25 to HRC 40 to ensure fatigue strength. Then, the link material is machined at the parts to be formed into a wheel tread, shoe mounting surface, pin hole, bushing hole, seal counter bore, shoe bolt holes and shoe nut bearing surfaces, so that they have their respective specified sizes (Step 5). Of these machined parts, the wheel tread part is susceptible to wear caused by earth and sand because high surface pressure would be imposed on the wheel tread part with earth and sand trapped between the wheel tread part and the track roller. To withstand the wear caused by earth and sand, the wheel tread part undergoes induction quenching and tempering (Steps 6, 7) to form a hardened layer having a thickness of about 5 to 15 mm and a hardness of about HRC45 to HRC55. Then, finish machining is applied to the machined parts, thereby finishing a track link (Step 8).

A track link usually loses its function and ends its service life when the wear of the wheel tread proceeds so that the flange of the track roller interferes with the track link or when the wheel tread becomes so thin that it is not strong enough to bear the weight of the vehicle any longer. It is therefore necessary to improve the wear life of the wheel tread as much as possible. To this end, it is effective to increase the depth of the hardened layer of the wheel tread.

However, the surface hardening method such as ordinary induction quenching and tempering process has the disadvantage that the hardened layer to be formed with the method is relatively shallow (about 15 mm), no matter how good the hardenability of the used material. If the heated surface region is deepened with the intention of obtaining a deeper hardened layer, heating time becomes longer with the result that the temperature of the wheel tread part becomes too high, leading to an increase in crystal grain size and consequently a decrease in the toughness of the wheel tread part.

Further, if induction heating is again applied to the link material which has once undergone entire quenching and tempering treatment in Steps 3 and 4, the link material will have the temperature distribution shown in FIG. 6 and the part a which is insufficiently heated will be brought into a condition similar to the case where high temperature tempering is done. As a result, a layer (i.e., the so-called soft zone) having hardness lower than the hardness already attained by thermal refining is formed as indicated by IQT (Induction Quenching—Tempering) product line in the hardness distribution comparative graph of FIG. 4, so that the strength of the link material becomes insufficient and, in consequence, peeling of the hardened layer occurs.

The invention is directed to overcoming the above problems and a primary object of the invention is therefore to provide a track link production method capable of providing markedly improved wear life with good cost performance and a track link produced by this method.

DISCLOSURE OF THE INVENTION

In a first aspect of the invention, the above object can be accomplished by a track link production method including:
a heat treatment process of applying quenching and low temperature tempering treatment to a whole link material after hot forging,
wherein desired machining is applied to the link material before the heat treatment process,
wherein after the heat treatment process, tempering and finish machining are sequentially applied to some of the parts which have undergone the machining process, said some parts including at least parts where high dimensional accuracy is required and parts where delayed failure may be caused by high stress due to press-fitting of a pin or bushing.

According to the first aspect, by the heat treatment process in which quenching and low temperature tempering treatment is applied to a whole link material after hot forging, the whole green body of the link material is hardened, resulting in formation of a deep hardened zone on the wheel tread surface of the link. Accordingly, the wear life of the track link can be significantly improved. In addition, since the desired machining is applied to the link material before the heat treatment process, that is, the link material in an easily processable condition with comparatively low hardness, accuracy defects due to difficult processing and poor cost performance can be prevented. Further, since after the heat treatment process, tempering (partial tempering) is applied to some of the parts of the link material which have undergone the machining process, the some parts including at least parts where high dimensional accuracy is required and parts where delayed failure may be caused by high stress due to press-fitting of a pin or bushing, strain inevitably caused by the heat treatment can be removed and the link material is softened and brought into an easily processable condition. As a result, finish machining after the partial tempering can be easily and reliably performed and dimensional accuracy can be ensured at low cost while preventing delayed failure.

In a second aspect of the invention, there is provided a track link produced by the track-link production method according to the first aspect, the track link having a hardness of at least HRC40 in an area extending from a wheel tread that comes into contact with a track roller to a center core and a grain size of at least Gh5 in the center core.

According to the second aspect, since wear resistance can be ensured for a long time owing to the high-strength, hardened zone formed in the area extending from the wheel tread to the center core, the wear life of the track link can be markedly improved.

In a third aspect of the invention, there is provided a track link having a hardness of HRC40 or less in the circumferences of a pin hole and a bushing hole.

According to the third aspect, since the hardness of the areas around the pin hole and bushing hole is HRC40 or less, delayed failure due to high stress caused by press-fitting of a pin or bushing can be prevented, finish machining can be easily and reliably carried out, and dimensional accuracy can be assured at low cost.

BRIEF DESCRIPTION OF THE DRAWINGS

FIG. 3 is a process chart of a track link production method according to one embodiment of the invention.

FIG. 4 is a graph showing a comparison between the hardness distribution of a finished product QT and that of a product IQT.

FIG. 5 is a process chart of a track link production method according to the prior art.

BEST MODE FOR CARRYING OUT THE INVENTION

Reference is now made to the accompanying drawings to describe a track link production method and a track link produced by the same according to a preferred embodiment of the invention. The present embodiment is associated with one application of the invention to a bulldozer which is a kind of track type (caterpillar tread type) vehicles incorporated in construction equipment.

Figure 1:
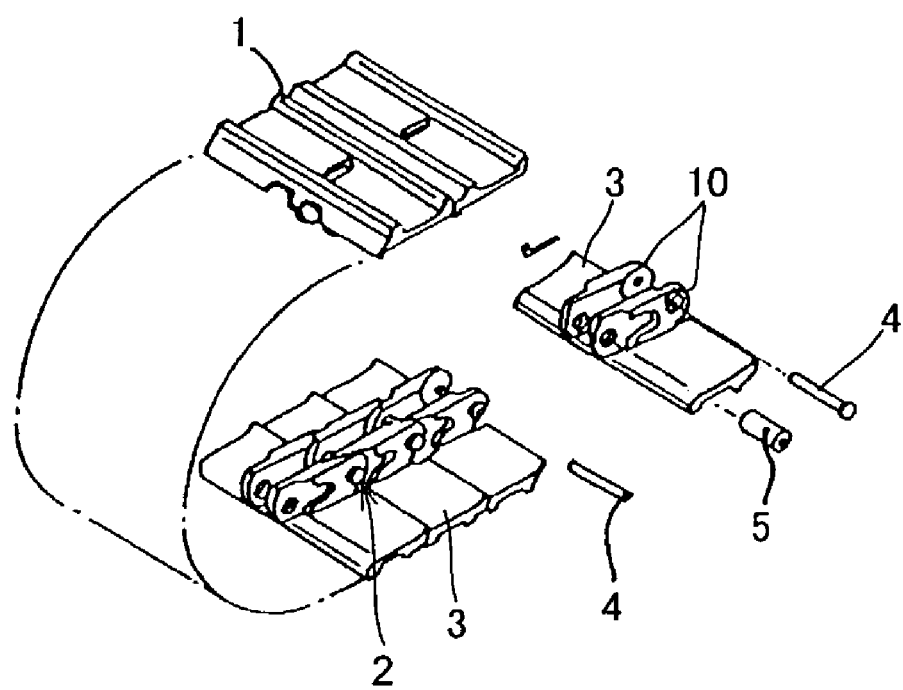
FIG. 1 is an exploded perspective view of a crawler belt according to an embodiment of the invention.
Figure 2:
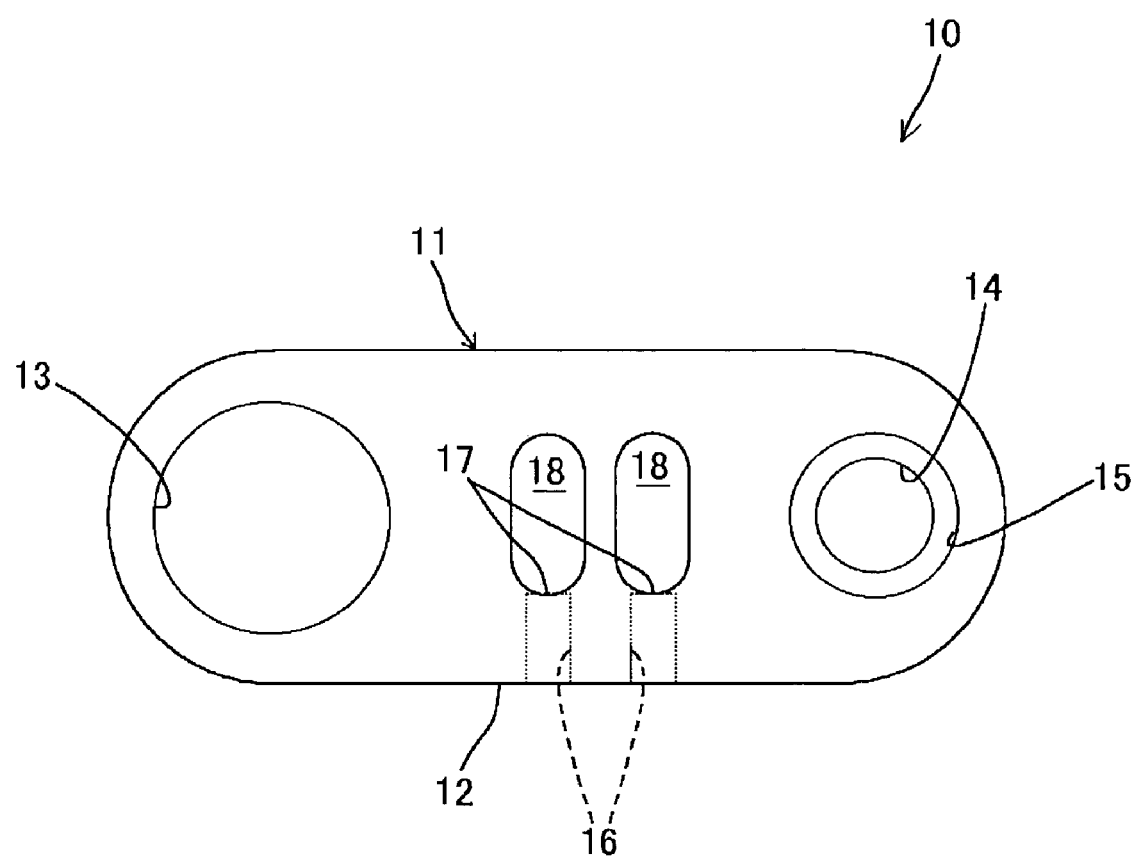
FIG. 2 is an outside view of a track link.
Figure 6:
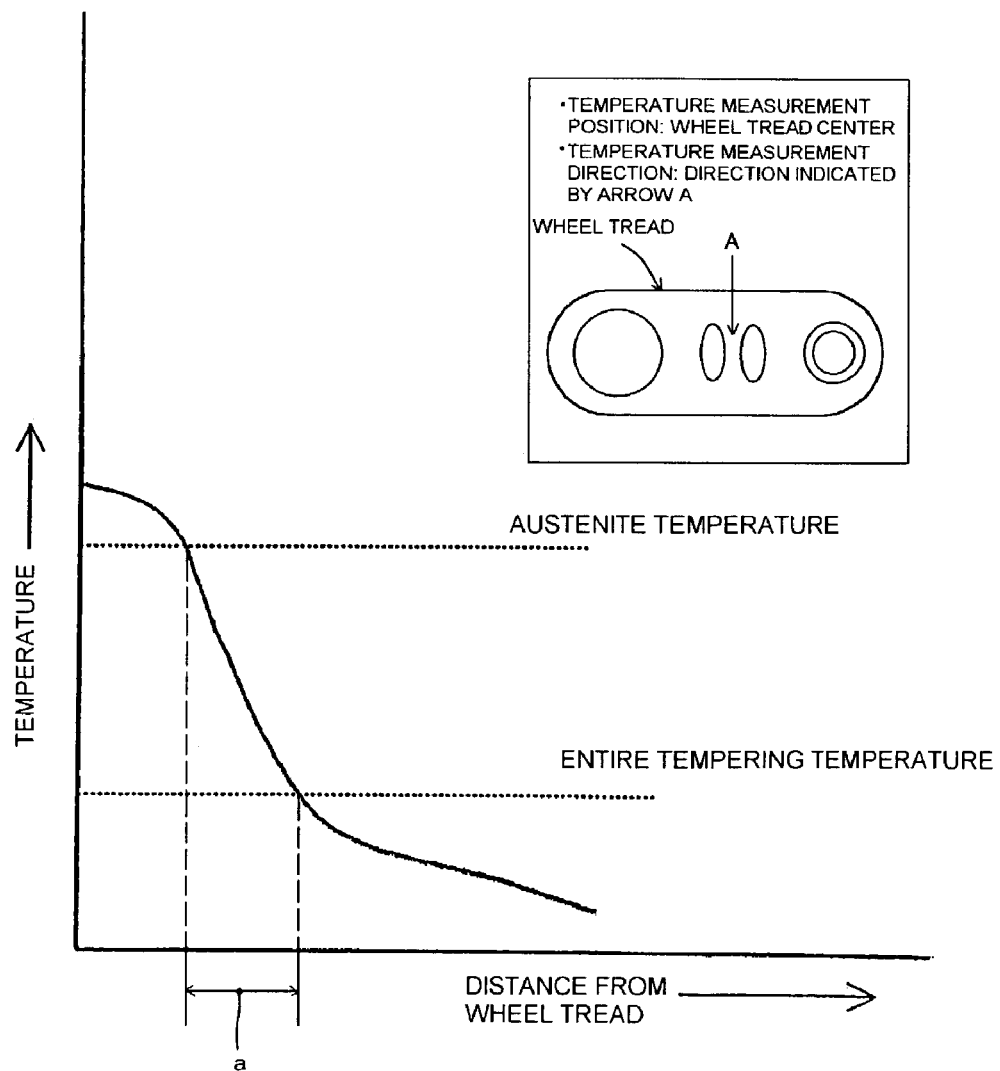
FIG. 6 is a graph showing a temperature distribution in a case where high-frequency heating is applied to a track link.

FIG. 1 shows an exploded perspective view of a crawler belt according to the present embodiment of the invention. FIG. 2 is an outside view of a track link.

The bulldozer according to the present embodiment has a vehicle body (not shown) and crawler belts 1 which are respectively disposed at both sides of the vehicle body, for forward and backward traveling and turning of the vehicle body. Each crawler belt 1 includes a track chain 2 wound around an idler (not shown) and a sprocket (not shown), and track shoes 3 clamped to the track chain 2 by bolts (not shown) and nuts (not shown). Rotation of each sprocket allows each crawler belt 1 to rotate between the idler and the sprocket. In this way, the vehicle body travels or turns.

The track chain 2 has laterally paired track links 10 which are circularly connected through coupling pins 4 and track bushings 5. As shown in FIG. 2, each track link 10 has a wheel tread 11 which comes in rolling contact with a track roller (not shown) while supporting the weight of the vehicle body positioned on the upper surface of the track link 10. Opposite to the wheel tread 11 is a shoe mounting surface 12 to which the track shoe 3 is attached. At one end of the track link 10, a bushing hole 13 is defined into which a track bushing 5 is inserted. At the other end, there are provided a pin hole 14 into which the coupling pin 4 is inserted and a seal counter bore 15 to which a seal is fit, the pin hole 14 and the seal counter bore 15 being concentric with each other. The track link 10 is further provided with shoe bolt holes 16 and shoe nut bearing surfaces 17. Inserted into each shoe bolt hole 16 is a bolt for attaching the track shoe 3. Seated on each shoe nut bearing surface 17 is a nut for attaching the track shoe 3. Note that the spaces designated by reference numeral 18 are windows for accommodating mounting nuts.

In the present embodiment, the track link 10 is manufactured in the production method comprised of the steps shown in FIG. 3. More specifically, a round or square bar made of high strength steel such as SMn based steel, SCM based steel or SNCM based steel is first prepared (Step 1). Then, this raw material is formed by hot-forging into a link material which has a form substantially similar to a finished product (Step 2). Subsequently to the hot-forging, the link material is subjected to natural cooling so as to be brought into an easily processable condition with comparatively low hardness, and such a link material then undergoes the desired machining process including processing for formation of the wheel tread 11, the shoe mounting surface 12, the bushing hole 13, the pin hole 14, the seal counter bore 15, the shoe bolts 16, the shoe nut bearing surfaces 17 and others (Step 3). In the stage of Step 3, the parts (e.g., the bushing hole 13, the pin hole 14 and the seal counter bore 15) which require high dimensional accuracy are subjected to only rough processing. On the other hand, the parts (e.g., the wheel tread 11, the shoe mounting surface 12, the shoe bolt holes 16 and the shoe nut bearing surfaces 17) which require tolerance of normal level or other parts whose dimensional accuracies are not important may be subjected to not only rough processing but also substantial finish machining according to the parts. Among the parts to be subjected to the machining in Step 3, the parts which have already attained, in the forging of Step 2, dimensional tolerance of the same level that can be obtained by the rough processing may skip the rough processing of Step 3. By applying the desired machining process to the link material before undergoing the heat treatment process (described later), that is, the link material in an easily processable condition having comparatively low hardness, accuracy defects and poor cost performance due to difficult processing can be prevented.

The following heat treatment is then applied to the whole link material which has undergone the machining of Step 3. Specifically, the link material is rapidly cooled from a temperature of 750° C. or more (more preferably, about 850° C.), using water, oil, a soluble agent or a quenching medium having similar effectiveness, whereby quenching of the whole material is carried out (Step 4). Thereafter, low temperature tempering is applied to the link material so as not to destroy the martensitic structure which has been formed in the quenching process of Step 4, and in the low temperature tempering, the whole link material is tempered at a temperature of 150° C. to 300° C. (Step 5). By virtue of the heat treatments of Steps 4 and 5, the green body of the link material is entirely hardened, at which time the hardness of the region of the link material from the wheel tread 11 to at least the center core (depth=about 30 mm) is HRC (Rockwell Hardness) 40 or more, or more preferably, HRC45 to HRC55.

The parts which need to be free from strain inevitably caused by the foregoing heat treatment, and above all, the circumferences of the parts (e.g., the bushing hole 13, the pin hole 14 and the seal counter bore 15) which require high dimensional accuracy and are susceptible to delayed failure due to high stress caused by press-fitting are partially tempered at a high temperature of about 400° C. to 650° C. (hereinafter referred to as "partial tempering") by induction tempering or frame baking, so that strain is removed and the material is softened to a hardness (HRC 40 or less) which provides comparatively high processability and less risks of delayed failure, while assuring necessary strength (Step 6). The desired parts including the parts which require high dimensional accuracy are subjected to finish processing, whereby they are set to their respective specified dimensional values (Step 7). The parts which require normal tolerance, the parts whose dimensional accuracies are not important and the parts (other than the press-fit parts of the pins and bushings) in which high stress is not caused by press-fitting may skip the finish machining of Step 7, provided that the levels of strain at the stages of Steps 5 and 6 in these parts are not a practical problem. By applying tempering treatment (partial tempering treatment) to at least the parts which require high dimensional accuracy and the parts which are susceptible to delayed failure due to high stress caused by press-fitting of a pin or bushing, among the parts of the link material which have undergone the prior machining process subsequently to the heat treatments of Steps 4 and 5, delayed failure can be prevented; strain inevitably caused by the heat treatment can be removed; and the material can be softened and brought into easily processable condition to carry out easy, reliable finish processing after the partial tempering, so that good cost performance and high dimensional accuracy can be ensured.

The track link 10 is produced through Steps 1 to 7 described earlier. FIG. 4 shows a comparison in terms of hardness distribution between a finished product QT (QT: Quenching and Tempering for hardening the entire section), that is, a track link produced by the production method of the present embodiment and a product IQT (IQ: Induction Quenching, T: Tempering), that is, a track link produced by the conventional method. According to the present embodiment, the entire link material is subjected to quenching and low temperature tempering in the heat treatments of Steps 4 and 5, whereby the link material is wholly hardened. As a result, a soft zone which is the problem of the prior art is not created; a deep hardened zone is formed so as to extend from the wheel tread 11 to the center core as indicated by finished product line QT in FIG. 4; and a grain size of Gh 5 or more can be assured up to its center core because the link material of the present embodiment is not partially exposed to high temperature unlike induction quenching. Accordingly, the wear life of the track link 10 can be markedly improved while ensuring high strength.

Next, a track link production method and track links produced by the same will be concretely described according to an example of the invention.

In this example, the materials shown in Table 1 were used and track links were produced by the production method of the invention under the manufacturing conditions shown in Table 2. As a result, track links having quality shown in Table 3 were gained.

TABLE 2

| ITEM | CONDITIONS | | |
|---|---|---|---|
| RAW MATERIAL | SNCM431 | SCM440Mod | SCM435 |
| FORGING HEATING TEMPERATURE | 1200° C.~1250° C. | ← | ← |
| TREATMENT AFTER FORGING | AIR COOLING | ← | ← |
| PARTS TO BE PROCESSED AFTER FORGING | PARTS 11, 12, 16, 17, IN FIG. 2 (NOTE 1) | ← | ← |
| ENTIRE QUENCHING TEMPERATURE | 850° C. | ← | ← |
| QUENCHING MEDIUM | OIL | ← | ← |
| ENTIRE TEMPERING TEMPERATURE | 200° C. | ← | ← |
| PARTS SUBJECTED TO PARTIAL TEMPERING | NEIGHBORHOOD OF PARTS 13, 14, 15 IN FIG. 2 | ← | ← |
| PARTS SUBJECTED TO PROCESSING AFTER PARTIAL TEMPERING (PARTS SUBJECTED TO FINISH MACHINING) | PARTS 13, 14, 15 IN FIG. 2 (NOTE 2) | ← | ← |

Note 1:
Since it was found that each of the parts (i.e., the bushing hole, the pin hole and the seal counter bore) designated by reference numerals 13, 14, 15 in FIG. 2 had a dimensional tolerance of the same level as obtained by the rough processing in hot forging, the rough processing in Step 3 of the present embodiment was omitted for the bushing hole 13, the pin hole 14 and the seal counter bore 15.

Note 2:
Since it was found that the amount of strain in each of the parts (i.e., the wheel tread, shoe mounting surface, shoe bolt holes and shoe nut bearing surfaces) designated by reference numerals 11, 12, 16, 17 in FIG. 2 after the entire tempering step (i.e., Step 5 of the present embodiment) was not a practical problem, the finish machining (i.e., Step 7 of the present embodiment) was omitted for the wheel tread 11, the shoe mounting surface 12, the shoe bolt holes 16 and the shoe nut bearing surfaces 17.

TABLE 3

| ITEM | RESULTS | | |
|---|---|---|---|
| QUALITY OF MATERIAL | SNCM431 | SCM440Mod | SCM435 |
| SURFACE HARDNESS AFTER FORGING AND AIR COOLING | HRC30 | HRC34 | HRC31 |
| SURFACE HARDNESS AFTER ENTIRE QUENCHING AND TEMPERING | HRC54.5 | HRC56.2 | HRC54 |
| HARDNESS OF CENTER CORE AFTER ENTIRE QUENCHING AND TEMPERING | HRC43.5 | HRC45.7 | HRC42.5 |

TABLE 1

| | C | Si | Mn | P | S | Ni | Cr | Mo | Nb | B |
|---|---|---|---|---|---|---|---|---|---|---|
| SNCM431 | 0.31 | 0.22 | 0.71 | 0.021 | 0.020 | 1.65 | 0.71 | 0.16 | — | — |
| SCM 440Mod | 0.40 | 0.23 | 0.41 | 0.010 | 0.008 | — | 1.01 | 0.50 | 0.03 | 0.03 |
| SCM435 | 0.35 | 0.21 | 0.65 | 0.025 | 0.021 | — | 1.05 | 0.16 | — | — |

TABLE 3-continued

| ITEM | RESULTS | | |
|---|---|---|---|
| QUALITY OF MATERIAL | SNCM431 | SCM440Mod | SCM435 |
| SURFACE HARDNESS OF PARTIALLY TEMPERED PARTS | HRC30~37 | HRC31~38 | HRC28~33 |
| GRAIN SIZE OF CENTER CORE AFTER ENTIRE QUENCHING AND TEMPERING | Gh 6 OR MORE | ← | Gh 5 OR MORE |

It is understood from Table 3 that, the track links produced from the above materials with the production method of the invention are all hard from the link wheel tread to the core, having Rockwell hardness high enough to withstand wear and are strong, having grain sizes of Gh 5 (JIS G0551: See Austenite Grain Size Nos.) or more, so that markedly improved wear life can be achieved.

The invention claimed is:

1. A method for producing a track link, said method comprising:
hot forging a link material;
machining the link material;
then applying a heat treatment process to an entirety of the link material, said heat treatment process comprising quenching and low temperature tempering the entirety of the link material;
then tempering parts of the link material which at least one of: (i) require high dimensional accuracy, and (ii) are susceptible to delayed failure caused by high stress due to press-fitting; and
finish machining said parts of the link material.

2. A track link produced by the method of claim 1, wherein the track link comprises a center core and a wheel tread that is adapted to contact a track roller; and
wherein the track link has a hardness of at least HRC40 in an area extending from the wheel tread to the center core, and a grain size of at least Gh5 in the center core.

3. The track link according to claim 2, wherein the track link further comprises a pin hole and a bushing hole, and the track link has a hardness of not more than HRC40 around circumferences of the pin hole and the bushing hole.

4. A method for producing a track link, wherein the track link comprises: a wheel tread, a shoe mounting surface to which a track shoe is attachable, a bushing hole, a pin hole, a seal counter bore concentric with the pin hole, shoe bolt holes, and shoe nut bearing surfaces, said method comprising:
hot forging a link material to have a form substantially similar to a final form of the track link;
machining the link material to process at least the wheel tread, the shoe mounting surface, the shoe bolt holes and the shoe nut bearing surfaces;
then applying a heat treatment process to an entirety of the link material, said heat treatment process comprising quenching and low temperature tempering the entirety of the link material;
then tempering parts of the link material surrounding the bushing hole, the pin hole and the seal counter bore; and
finish machining at least the bushing hole, the pin hole and the seal counter bore.

* * * * *